United States Patent
Ravinathan et al.

(10) Patent No.: US 11,783,309 B2
(45) Date of Patent: Oct. 10, 2023

(54) ELECTRONIC SYSTEM AND COMPUTERIZED METHOD FOR CONTROLLING OPERATION OF SERVICE DEVICES

(71) Applicant: Mastercard Asia/Pacific PTE. LTD., Singapore (SG)

(72) Inventors: Srinath Ravinathan, Singapore (SG); Donghao Huang, Singapore (SG); Bensam Joyson, Singapore (SG)

(73) Assignee: Mastercard Asia/Pacific PTE. LTD., Singapore (SG)

( * ) Notice: Subject to any disclaimer, the term of this patent is extended or adjusted under 35 U.S.C. 154(b) by 0 days.

(21) Appl. No.: 17/100,089

(22) Filed: Nov. 20, 2020

(65) Prior Publication Data
US 2021/0158316 A1     May 27, 2021

(30) Foreign Application Priority Data
Nov. 22, 2019   (SG) .............................. 10201911045R

(51) Int. Cl.
*G06Q 20/12*     (2012.01)
*G06Q 20/40*     (2012.01)
(Continued)

(52) U.S. Cl.
CPC .......... *G06Q 20/127* (2013.01); *G06Q 20/02* (2013.01); *G06Q 20/385* (2013.01); *G06Q 20/40* (2013.01)

(58) Field of Classification Search
CPC . G06Q 20/367; G06Q 20/322; G06Q 20/3674
(Continued)

(56) References Cited

U.S. PATENT DOCUMENTS 5,596,501 A * 1/1997 Comer .................. B67D 7/228
                                                        705/413
7,096,494 B1   8/2006 Chen
(Continued)

OTHER PUBLICATIONS

Bamasoud, Doaa M., et al. "An Explorative Study for Laundry Mobile Application." International Journal of Advanced Computer Science and Applications 9.4 (2018). (Year: 2018).*
(Continued)

*Primary Examiner* — Eric T Wong
*Assistant Examiner* — John O Preston
(74) *Attorney, Agent, or Firm* — Pramudji Law Group PLLC; Ari Pramudji

(57) ABSTRACT

The present disclosure generally relates to controlling operation of service devices. A payment network server receives, from a merchant aggregator, an operation request from a user for operation of one or more service of the devices associated with the merchant aggregator, the operation request comprising identification data of each service device, an operation mode selected by the user for each service device, and a payment token of the user; identifies, based on the identification data of each service device, a device server communicatively connected with the service device; communicates, to the respective device servers, operation instructions for controlling access to the service devices, the instructions comprising activating the service devices, thereby permitting the user to access the service devices; determining a payment amount for operation of the service devices requested in the operation request based at least on the selected operation modes; and processing a payment transaction for paying the payment amount to the merchant aggregator using the payment token.

20 Claims, 5 Drawing Sheets

(51) Int. Cl.
    *G06Q 20/38*     (2012.01)
    *G06Q 20/02*     (2012.01)

(58) Field of Classification Search
    USPC .......................................................... 705/44
    See application file for complete search history.

(56) References Cited

U.S. PATENT DOCUMENTS

| | | | |
|---|---|---|---|
| 8,086,533 | B1 | 12/2011 | Maglaque et al. |
| 2006/0016878 | A1* | 1/2006 | Singer .................. G06Q 20/382 |
| | | | 235/380 |
| 2012/0330839 | A1 | 12/2012 | Kavanagh et al. |
| 2013/0304648 | A1 | 11/2013 | O'Connell et al. |
| 2014/0115694 | A1 | 4/2014 | Fadell et al. |
| 2015/0012434 | A1 | 1/2015 | Aabye et al. |
| 2015/0282261 | A1 | 10/2015 | Recker et al. |
| 2015/0348043 | A1 | 12/2015 | Leger |
| 2016/0358175 | A1 | 12/2016 | Weller et al. |
| 2017/0140347 | A1* | 5/2017 | Berman .................. G06Q 20/36 |
| 2018/0232716 | A1* | 8/2018 | Conforti ................ G06Q 20/18 |
| 2020/0286077 | A1* | 9/2020 | Berman .................. G06Q 20/32 |
| 2021/0398123 | A1 | 12/2021 | Snehasri et al. |

OTHER PUBLICATIONS

Gupta, Akanksha, Debendra Kumar Panda, and Mayank Pande. "Development of mobile application for laundry services using android studio." International Journal of Applied Engineering Research. India (2018). (Year: 2018).*

Mei, Leong Yi, et al. "LaundryMama: Humanising Laundry Tasks using Laundry Management System and Laundry-On-Demand Mobile Applications." IOP Conference Series: Materials Science and Engineering. vol. 767. No. 1. IOP Publishing, 2020. (Year: 2020).*

International Search Report and Written Opinion, PCT/US2021/053879, dated Dec. 16, 2021, pp. 1-8.

* cited by examiner

ELECTRONIC SYSTEM AND COMPUTERIZED METHOD FOR CONTROLLING OPERATION OF SERVICE DEVICES

TECHNICAL FIELD

The present disclosure generally relates to electronic systems and computerized methods for controlling operation of service devices. Particularly, the present disclosure describes various embodiments of electronic systems and computerized methods for controlling access to and operation of one or more service devices associated with a merchant aggregator.

BACKGROUND

Users or consumers often consume services through use of various service devices such as washing machines, dryers, and vending machines. Traditionally, a user may operate a publicly-accessible service device with physical money, such as by inserting coins. In this Internet day and age, many service devices now come with network connectivity capabilities and are able to accept payments from other payment instruments, such as credit cards and stored-value accounts. For example, a user may purchase a product from a vending machine by using his credit card. The vending machine tokenizes the credit card into a payment token and sends the payment token to the payment network for payment of the purchased product to the supplier of the vending machine (i.e. the merchant).

While service devices such as washing machines and vending machines are commonly seen in developed countries, less developed regions such as Africa provide other types of service machines to their people. For example, many people in Africa have limited or no access to electricity. Some solar energy providers (i.e. the merchants) in Africa have offered solar energy service devices that allow users to purchase solar energy to power their homes. The purchases are made using solar credits which the users purchase and pay to the merchants through conventional payment modes. Additionally, the merchants have a mobile application which the users can use to purchase solar credits for using the solar energy service devices. The solar credits can be purchased with a credit card and paid to the merchants.

However, payment for usage of service devices directly to the merchants may not be feasible for cases where the service devices are leased out. For example, service devices such as washing machines and dryers are often leased out to hotels for use by guests. Similarly, landlords renting out apartments may purchase service devices for use by tenants in the apartments. Payment for usage of these service devices directly to the merchants is not feasible as the hotels/landlords would not be able to earn from their leasing/purchase of these service devices which the hotels/landlords have paid to the merchants.

Therefore, in order to address or alleviate at least one of the aforementioned problems and/or disadvantages, there is a need to provide an improved electronic system and computerized method for controlling operation of service devices.

SUMMARY

According to a first aspect of the present disclosure, there is a payment network server, a computerized method, and a non-transitory computer-readable storage medium comprising instructions for controlling operation of service devices. The payment network server is communicatively connected to an application server of a merchant aggregator and a number of device servers, each device server communicatively connected with a number of service devices associated with the merchant aggregator. The payment network server comprises an operation request module, an operation instruction module, and a payment module configured for performing steps of the method.

The usage request module is configured for: receiving, from the application server, an operation request from a user for operation of one or more of the service devices, the operation request comprising identification data of each service device, an operation mode selected by the user for each service device, and a payment token associated with a payment instrument of the user; and identifying, based on the identification data of each service device, the device server communicatively connected with the respective service device.

The operation instruction module is configured for: communicating, to the respective device server, a set of operation instructions for controlling access to each service device, the operation instructions comprising an activation instruction for activating the respective service device, thereby permitting the user to access the respective service device.

The payment module is configured for: determining a payment amount for operation of the service devices requested in the operation request based at least on the selected operation modes; and processing a payment transaction for paying the payment amount to the merchant aggregator using the payment token.

An electronic system and computerized method for controlling operation of service devices according to the present disclosure are thus disclosed herein. Various features, aspects, and advantages of the present disclosure will become more apparent from the following detailed description of the embodiments of the present disclosure, by way of non-limiting examples only, along with the accompanying drawings briefly described below.

DETAILED DESCRIPTION

In the present disclosure, depiction of a given element or consideration or use of a particular element number in a particular figure or a reference thereto in corresponding descriptive material can encompass the same, an equivalent, or an analogous element or element number identified in another figure or descriptive material associated therewith. The use of "I" in a figure or associated text is understood to mean "and/or" unless otherwise indicated. For purposes of brevity and clarity, descriptions of embodiments of the present disclosure are directed to an electronic system and computerized method for controlling operation of service devices, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, known systems, methods, procedures, and components have not been described in detail so as to not unnecessarily obscure aspects of the embodiments of the present disclosure.

Overview

Figure 1:
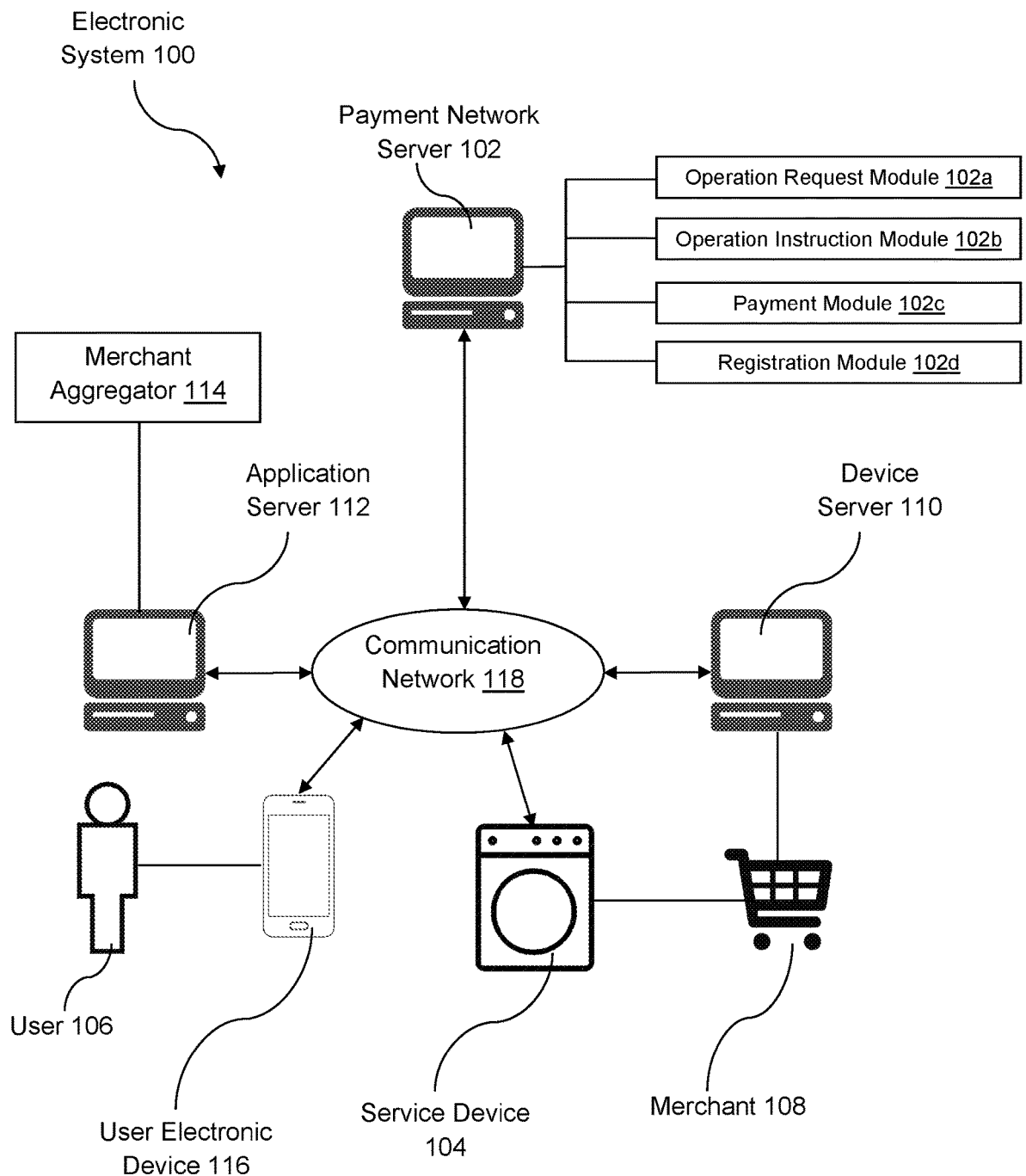
FIG. 1 is an illustration of an electronic system for controlling operation of service devices, in accordance with embodiments of the present disclosure.

In representative or exemplary embodiments of the present disclosure, there is an electronic or computer system 100 including a payment network server 102 for controlling operation of service devices 104, as illustrated in FIG. 1. The service devices 104 are operable or useable by consumers or users 106 and include, but are not limited to, washing machines, dryers, and vending machines. Each service device 104 is provided by a merchant 108 which may be the manufacturer of the service device 104. Additionally, the merchant 108 operates a device server 110 that is communicatively connected with the respective service device 104. The system 100 includes an application server 112 operated by a merchant aggregator 114. The merchant aggregator 114 may be a business or commercial entity providing an environment or venue for use by users 106, wherein the environment/venue is provided with various service devices 104 for use by the users 106. The merchant aggregator 114 may be, but is not limited to, a laundromat providing service devices 104 such as washing machines and dryers for users 106. The payment network server 102 is communicable with the application server 112 which is communicatively connected with multiple device servers 110 of the service devices 104.

The system 100 includes a user electronic device 116 operated by each user 106. The merchant aggregator 114 operates an aggregator platform on the application server 112 for users 106 to request operation or usage of the service devices 104. In many embodiments, the user electronic device 116 is operated by the user 106 to access the aggregator platform and to initiate operation requests for operating/using a set of service devices 104. In one example, a software or mobile application is installed and executable on the user electronic device 116 and is communicable with the application server 112 for accessing the aggregator platform. In another example, the user electronic device 116 may access the aggregator platform through a website of the merchant aggregator 114. The payment network server 102, service devices 104, device servers 110, application server 112, and user electronic devices 116 are communicable with one another through a communication network 118.

Figure 2:
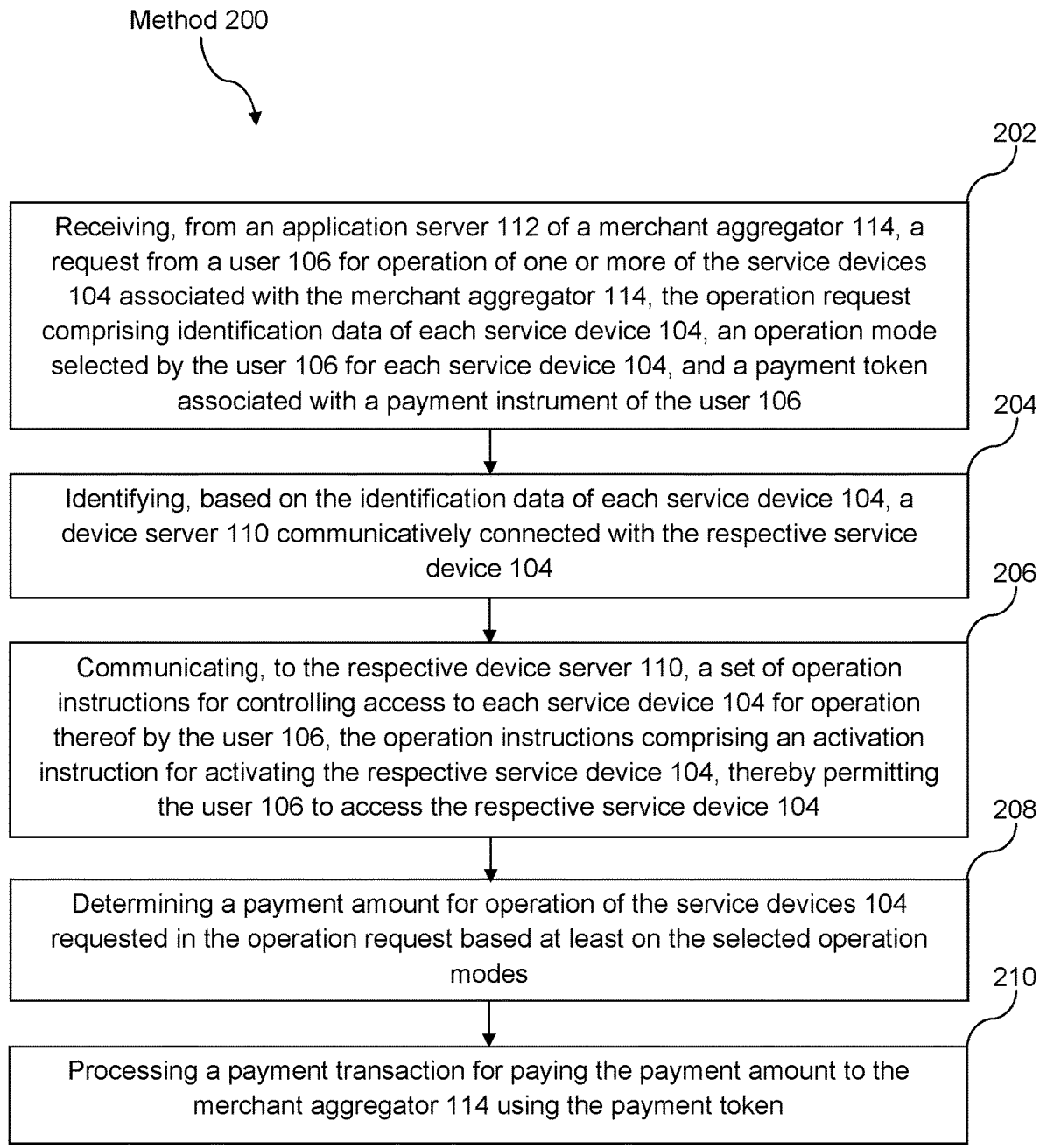
FIG. 2 is a flowchart illustration of a computerized method implemented on a payment network server for controlling operation of service devices, in accordance with embodiments of the present disclosure.

With reference to FIG. 2, there is shown a computer-implemented or computerized method 200 implemented on the payment network server 102 for controlling operation of the service devices 104. The payment network server 102 includes various modules/components for performing various steps of the method 200, including an operation request module 102a, an operation instruction module 102b, a payment module 102c, and a registration module 102d.

In a step 202 of the method 200, the operation request module 102a receives, from the application server 112, an operation request from a user 106 for operation of one or more of the service devices 104. The operation request includes identification data of each service device 104, an operation mode selected by the user 106 for each service device 104, and a payment token associated with a payment instrument of the user 106. In some embodiments, the operation request relates to the user 106 requesting to use a washing machine at a laundromat. The use of the washing machine may be for a predefined time period or for a predefined charge amount. Alternatively, the use of the washing machine may be based on an ongoing basis wherein the user 106 decides when to stop said use and the user 106 would be charged according to the time period of said use. The user 106 accesses the aggregator platform which presents a list of the service devices 104 at the laundromat from which the user 106 selects a washing machine. Additionally, the user 106 selects the operation mode, such as based on the predefined time period or predefined charge amount. The user 106 then sends the operation request to the application server 112 together with the payment token.

In a step 204, the usage request module 102a identifies, based on the identification data of each service device 104, the device server 110 communicatively connected with the respective service device 104. As mentioned above, the device server 110 is operated by the merchant 108 that provided the service device 104, such as the manufacturer of the washing machine. In a step 206, the operation instruction module 102b communicates, to the respective device server 110, a set of operation instructions for controlling access each service device 104 for operation thereof by the user 106. The operation instructions include an activation instruction for activating the respective service device 104, thereby permitting the user 106 to access the respective service device 104. The operation instructions may further include a deactivation instruction for deactivating each service device 104 in response to lapsing of the respective time period for using the service device 104, thereby denying the user 106 access to the respective service device 104.

In a step 208, the payment module 102c determines a payment amount for operation of the service devices 104 requested in the operation request based at least on the selected operation modes. In one example, the payment amount is the charge amount predefined by the user 104. In another example, the payment amount is calculated based on the time period predefined by the user 104, i.e. the time period during which the user 104 is permitted access to operate the washing machine. In another example, the payment amount is calculated based on actual time period, which is not predefined by the user 104, of operation of the washing machine. In a step 210, the payment module 102c processes a payment transaction for paying the payment amount to the merchant aggregator 114 using the payment token.

Accordingly, the user 106 can pay for operation of the one or more service devices 104 directly to the merchant aggregator 114, instead of separate payments to the respective merchants 108 of the service devices 104. The method 200 thus provides a convenient way for users 106 to request operation of the service devices 104 and to make payment for the operation. This advantageously allows the service devices 104 to be leased out to merchant aggregators 114 such as hotels for use by guests. The guests can use these service devices 104 in the hotels and make a consolidated payment to the hotel, instead of separate payments to the merchants 108 for using their service devices 104 and to the hotel for the guest rooms.

DESCRIPTION OF EMBODIMENTS

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element or limitation. Furthermore, repeated use of the phrase "in an embodiment/example" or "in another embodiment/example" does not necessarily refer to the same embodiment/example.

As used herein, the terms "a" and "an" are defined as one or more than one. The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment.

As used herein, the terms "component", "module," "system", "apparatus", "interface", and the like are generally intended to refer to a computer-related entity, either hardware, a combination of hardware and software, software, or software in execution. For example, a component or a module may be, but is not limited to being, a process running on a processor, a processor, an object, an executable, a thread of execution, a program, and/or a computer. By way of illustration, both an application running on a controller and the controller can be a component/module. One or more components/modules may reside within a process and/or thread of execution. A component/module may be localized on one computer and/or distributed among a plurality of computers.

While various terms as used in representative or exemplary embodiments of the present disclosure are defined herein, the definitions of these terms are not intended to be limited as such and are in addition to their plain meanings according to standard English dictionaries.

In various embodiments of the present disclosure, the electronic system 100 includes the payment network server 102 for controlling operation of service devices 104. The system 100 further includes the device servers 110, application server 112, and user electronic devices 116, wherein one or more or all of which are communicable with one another through the communication network 118.

The payment network server 102 is a computer server associated with a payment network of various payment instruments and which is operated by an intermediary entity. Typically, the intermediary entity is a card association, such as a credit card association, that facilitates communications between acquirer institutions and issuer institutions to authorize and fund transactions. The payment network settles the transactions between various acquirer institutions and issuer institutions, when payment instruments such as credit cards are used for payment of transactions. Some examples of payment networks operated by intermediary entities include the Banknet payment network operated by Mastercard® and the VisaNet payment network operated by Visa®. Some other examples of intermediary entities that operate payment networks include American Express®, Discover®, and Diners Club®. It will be appreciated that payment of the transactions are processed by the payment network server 102 in a standard manner across the payment network, involving entities such as the acquirer institutions and issuer institutions.

The user 106 is an individual who is an account holder of an account which refers to any financial account, such as current account, savings account, trading account, or any account associated with a user payment instrument. In some embodiments, the account is a bank account maintained by a financial institution, such as an issuer institution or bank. In some other embodiments, the account is a digital wallet maintained the intermediary entity, an issuer institution or bank, or a third-party service provider. The account is linked to the payment instrument and thus the payment instrument stores identification information of the account. The account identification information may be stored in the form of an electronic chip or a machine-readable magnetic strip embedded in the payment instrument. The account identification information may include an account number and the name of the account holder. The payment instrument has a unique identifier, an expiry date, security data, and type.

The payment instrument refers to any suitable cashless payment mechanism, such as payment cards or transaction cards, which the user 106 may use to perform transactions, such as deposits and withdrawals, credit transfers, merchandise purchase, payment transactions, and the like. In some embodiments, the payment instrument is a physical card, such as credit card, debit card, membership card, promotional card, contactless card, charge card, frequent flyer card, gift card, prepaid card, or the like. The payment instrument may be radio frequency identification (RFID) or near field communication (NFC) enabled for performing contactless payment transactions. In some other embodiments, the payment instrument is stored electronically in memory of an electronic device, such as on an application or digital wallet resident or operative on the user electronic device 116. The user electronic device 116 may be a mobile device, mobile phone, smartphone, personal digital assistant (PDA), key fob, transponder device, NFC-enabled device, tablet, phablet, laptop, computer, other communication device, or the like.

The communication network 118 is a medium or environment through which content, notifications, and/or messages are communicated among various entities, including the payment network server 102, service devices 104, device servers 110, application server 112, and user electronic devices 116. Some non-limiting examples of the communication network 118 include a virtual private network (VPN), wireless fidelity (Wi-Fi) network, light fidelity (Li-Fi) network, local area network (LAN), wide area network (WAN), metropolitan area network (MAN), satellite network, Internet, fiber optic network, coaxial cable network, infrared (IR) network, radio frequency (RF) network, and any combination thereof. Various entities in the communication network 118 may connect to the communication network 118 in accordance with various wired and wireless communication protocols, such as Transmission Control Protocol/Internet Protocol (TCP/IP), User Datagram Protocol (UDP), 2nd to 5th Generation (2G to 5G) communication protocols, Long Term Evolution (LTE) communication protocols, and any combination thereof. Each of the payment network server 102, service devices 104, device servers 110, application server 112, and user electronic devices 116 includes a data communication or transceiver module to communicate and transmit/receive data over the communication network 118. Some non-limiting examples of a transceiver module include an antenna module, a radio frequency transceiver module, a wireless transceiver module, a Bluetooth transceiver module, an Ethernet port, a Universal Serial Bus (USB) port, or any other module/component/device configured for transmitting and receiving data.

In some embodiments, the merchant aggregator 114 is a laundromat providing service devices 104 such as washing machines and dryers. In some embodiments, the merchant aggregator 114 is a hotel operator or an apartment landlord providing service devices 104 such as electronic devices like computers, television devices, and streaming devices. In some embodiments, the merchant aggregator 114 is a hotel aggregator such as Agoda that lists various hotels and apartments for booking by users 106. In some embodiments, the merchant aggregator 114 is an apartment aggregator such as Airbnb and Homestay that lists private homes and apartments for booking by users 106. It will be appreciated that the service devices 104 can be of various types that provide services and/or amenities for use by the users 106, and the merchant aggregator 114 may be any operator providing these service devices 104. For example, the service devices 104 may be vending machines, gaming/recreational devices, solar energy service devices, water purifiers, or a combination of solar energy and water purifying service devices (such as one produced by Quench Water & Solar).

Each service device 104 is provided by a merchant 108 which operates a device server 110 communicatively connected with the respective service device 104. In many embodiments, the merchant 108 is the manufacturer of the service device 104. Additionally, the merchant 108 may operate an Internet of Things (IoT) platform or network across their service devices 104, allowing the merchant 108 to monitor usage of the service devices 104. The IoT platform may be operated through a cloud service provider at the device server 110. In one example, the merchant 108 is LG and the IoT platform is the LG SmartThinQ. In another example, the merchant 108 is Samsung and the IoT platform is the Samsung SmartThings.

As described above, the service devices 104 are associated with the merchant aggregator 114 and the merchant aggregator 114 provides an aggregator platform for the users 106 to request operation of these service devices 104. Associating the service devices 104 with the merchant aggregator 114 allows the service devices 104 to be listed on the aggregator platform for selection by the users 106. Each service device 104 is associated with the merchant aggregator 114 by a registration process 300 performed by the registration module 102*d* of the payment network server 102.

Figure 3:
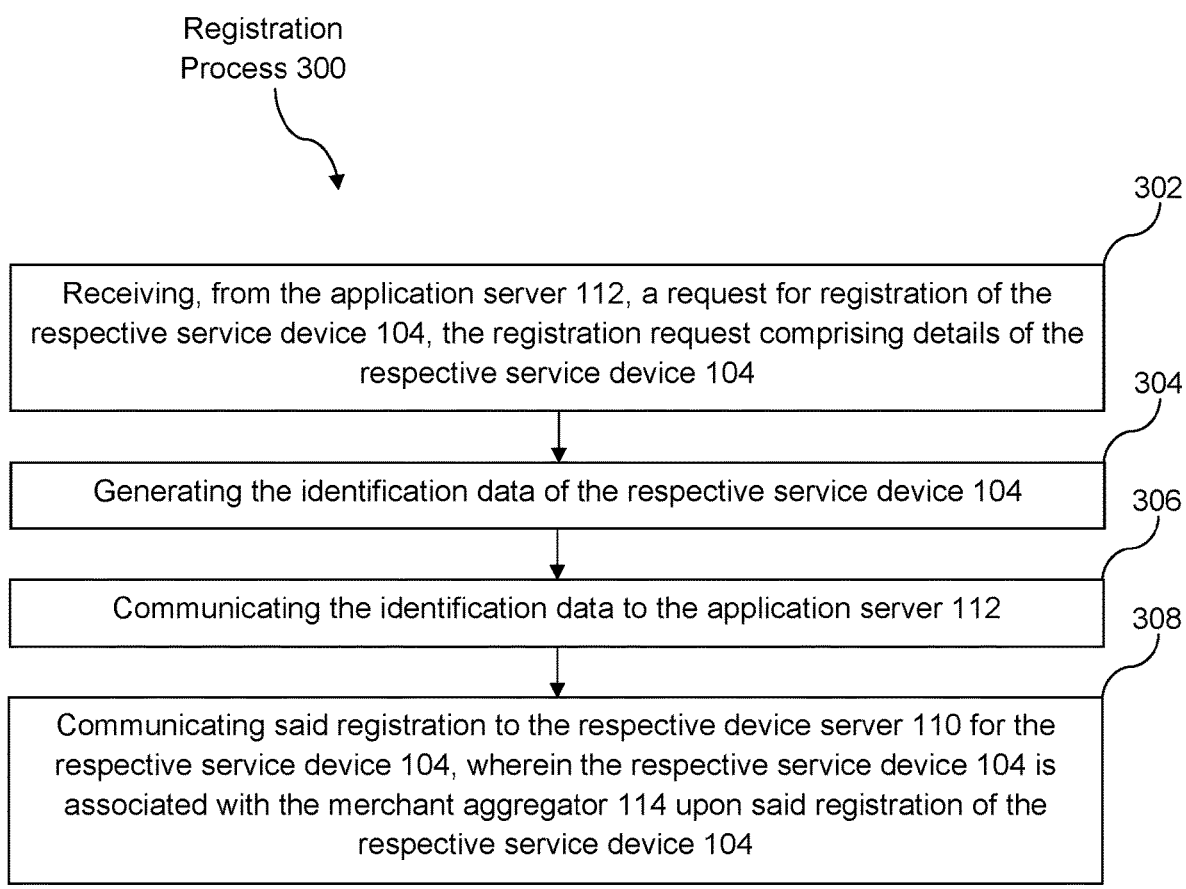
FIG. 3 is a flowchart illustration of a registration process for the service devices, in accordance with embodiments of the present disclosure.

With reference to FIG. 3, in a step 302 of the registration process 300 performed for each service device 104, the registration module 102*d* receives, from the application server 108, a registration request for registration of the respective service device 104. The registration request is initiated by the merchant aggregator 114 to associate the respective service device 104 therewith, such as to associate a washing machine with a laundromat. The registration request includes details of the respective service device 104. The details may include a unique identifier of the service device 104, such as one defined by the merchant 108 of the service device 104. Some non-limiting examples of the unique identifier may be the merchant product code for the service device 104 or a hardware identifier such as a media access control (MAC) address.

In some embodiments, the service device details of each service device 104 further includes cloud adaptor data for facilitating communication between the payment network server 102 and the device server 110 for the respective service device 104. The cloud adaptor data provides software/firmware for controlling transfer of information between the payment network server 102 and the device servers 110, and specifically to interface with the IoT platforms of the respective merchants 108. In some embodiments, the service device details of each service device 104 include a set of usage modes selectable by the user 106. The set of usage modes may include one that is based on a time period and/or one that is based on a charge amount, wherein the time period/charge amount is defined by the user for said using of the service device 104. The set of usage modes may include one that is based on an ongoing basis wherein the user 106 decides when to stop said using of the service device 104.

In a step 304, the registration module 102*d* generates the identification data of the respective service device 104. In a step 306, the registration module 102*d* communicates the identification data to the application server 112. The identification data may be based on the service device details or may be uniquely generated based on a common system so as to allow the merchant aggregator 114 to conveniently sort various service devices 104 from various merchants 108. In a step 308, the registration module 102*d* communicates said registration to the respective device server 110 for the respective service device 104. This informs the merchant 108 that the respective service device 104 is associated with the merchant aggregator 114 and the IoT platform of the merchant 108 would be able to monitor usage of the service device 104 and determine or generate usage data of said usage. The respective service device 104 is thus associated with the merchant aggregator 114 upon said registration of the respective service device 104.

Figure 4:
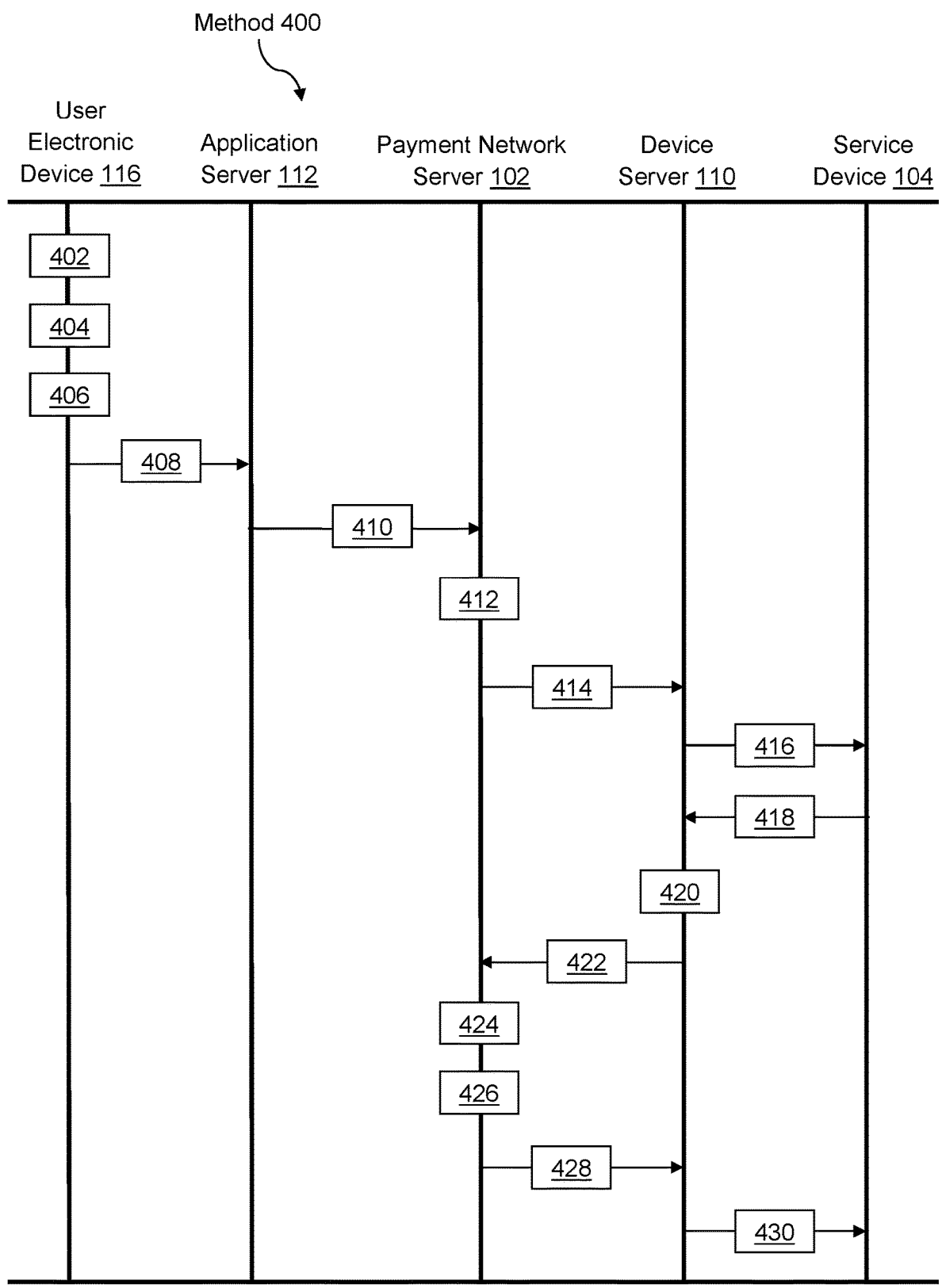
FIG. 4 is a schematic illustration of a computerized method implemented on the electronic system for controlling operation of service devices, in accordance with embodiments of the present disclosure.

In some embodiments with reference to FIG. 4, there is a computer-implemented or computerized method 400 implemented on the system 100 for controlling operation of service devices 104. The method 400 relates to an exemplary use case wherein the user 106 is requesting to operate or use a washing machine (service device 104) at a laundromat (merchant aggregator 114). Other examples of use cases are described further below.

In a step 402 of the method 400, the user 106 executes the application on the user electronic device 116 to access the aggregator platform provided by the merchant aggregator 114. Alternatively, the user electronic device 116 accesses the aggregator platform via a website of the merchant aggregator 114. In a step 404, the user 106 selects, with the user electronic device 116, one or more service devices 104 to be operated. The user electronic device 116 may discover and display a number of service devices 104 associated with the merchant aggregator 114 for selection by the user, such as based on proximity by searching for the service devices 104 based on location data of the user electronic device 116. For example, if the user 106 is at the laundromat, the service devices 104 located at the laundromat, i.e. the washing machines and dryers, would be displayed on the user electronic device 116. The service devices 104 may display the identification data of such as codified data or barcodes. Some non-limiting examples of codified data include Quick Response (QR) code, barcode, EZcode, high capacity color barcode, ShotCode, MaxiCode, GTIN12 code, GTIN-13 code, and Aztec code. For example, the user 106 uses the user electronic device 116 to scan the QR code of the service device 104 he wants to use. The identification data may be in the form of a unique serial number, such as a USSD code, which the user 106 is able to input into the application. The identification data may be in the form of an electronic tag, such as an RFID (radio frequency identification) or NFC (near field communication) tag readable by the user electronic device 116. The user electronic device 116 may display all the service devices 104 associated with the merchant aggregator 114 and the user 106 sorts/filters the service devices 104 based on various parameters, such as proximity by current location, type of service provided, identification data, and/or preferred brands.

In a step 406, the user 106 selects an operation mode for each service device 104 to be operated. For example, in the steps 404 and 406, the user 106 selects his preferred brand and/or model type of washing machine at the laundromat, as well as the operation mode for the washing machine. For example, the user 106 may select an operation mode based on a predefined time period and proceeds to define this time period, such as 1 hour. Alternatively, the user 106 may select an operation mode based on a predefined charge amount and proceeds to define this charge amount, such as $10. Yet alternatively, the user 106 may select a specific operating cycle of the washing machine, such as delicate cycle. Additionally, the user 106 selects a payment instrument for payment for operation of the service devices 104. The payment instrument may be selected from a set of payment instruments pre-stored on the user electronic device 116, or the user 106 may enter the details of the payment instrument, such as credit card details.

In a step 408, the user electronic device 116 generates and sends an operation request for operation of the service devices 104 to the application server 112. In a step 410, the application server 112 communicates, to the payment network server 102, the operation request including the identification data of each service device 104, the operation mode selected by the user 104 for each service device 104, and a payment token associated with the user payment instrument. As will be readily understood by the skilled person, the payment token is a tokenization of the user payment instrument to replace sensitive data thereof with secure surrogate data. Said tokenization may be implemented in a host application or platform such as the Mastercard Digital Enablement Service (MDES) provided by Mastercard®. In one embodiment, the application server 112 identifies the identification data of the selected service devices 104 before sending the operation request, wherein the identification data generated during the registration process 300. In another embodiment, the application server 112 identifies the identification data based on the identification data, e.g. QR code or USSD code, input by the user 106.

In a step 412, the payment network server 102 identifies, based on the identification data of each service device 104, the device server 110 communicatively connected with the respective service device 104. In a step 414, the payment network server 102 communicates, to the respective device server 110, a set of operation instructions for controlling access to each service device 104 for operation thereof by the user 106. The operation instructions include an activation instruction for activating the respective service device 104, thereby permitting the user 106 to access the respective service device 104. The operation instructions may further include a deactivation instruction for deactivating the service device 104, thereby denying the user 106 access to the service device 104, as described below. Accordingly, in a step 416, the device server 110 communicates, to the respective service device 104, the activation instruction for activating the respective service device 104 and permits the user 106 to begin operating or using the service device 104. The device server 110 is thus configured to control access permission and operation of the respective service device 104 by the activation and deactivation of the respective service device 104.

In some embodiments, the payment network server 102 authenticates the payment token for said payment to the merchant aggregator 114. The operation instructions are subsequently communicated to the device servers 110 in response to authentication of the payment token. This would ensure that payment can be made with the payment token before the service devices 104 are activated for use by the user 106. Optionally, the payment network server 102 may review the spending history of the user 106 based on transactions made with the payment token or the payment instrument associated therewith. Appropriate instructions may be communicated to the device servers 110 based on the review of the user's spending history. For example, a user 106 with poor spending history, such as having high credit debt, may not be allowed to activate any service device 104 as there may be a risk of non-payment for usage of the service device 104. The service device 104 would be electronically locked to prevent the user 106 from using it.

In some embodiments, in a step 418, the device server 110 monitors operation usage of the service device 104. In a step 420, the device server 110 generates operation usage data of the service device 104 based on operation thereof by the user 106 during the permitted access, i.e. during the period of time when the user 106 has been permitted access to operate or use the service device 104. In a step 422, the device server 110 communicates the usage operation data of the service device 104 to the payment network server 102.

In a step 424, the payment network server 102 determines a payment amount for the operation of the service devices 104 requested in the operation request based at least on the selected operation modes. The payment amount is thus determined after operation or use of the service devices 104 are completed and the user 106 no longer has access to the service devices 104. For example, the payment amount is determined based on the selected operation mode wherein the operation of the washing machine is based on an ongoing basis. In a step 426, the payment network server 102 processes a payment transaction for paying the payment amount to the merchant aggregator 114 using the payment token. It will be appreciated that the processing of the payment transaction is in accordance with one or more standards for the interchange of transaction messages, such as the ISO 8583 standard, and occurs in a standard manner across the payment network, such as via the conventional four-party system or three-party system.

In a step 428, the payment network server 102 communicates, to the respective device server 110, a payment confirmation message informing the merchant 108 that the user 106 has already paid for the operation of the respective service device 104. In a step 430, the device server 110 communicates, to the respective service device 104, a corresponding payment confirmation message informing the user 106 that the payment has been successfully processed. The message may be displayed on a screen of the service device 104. In some embodiments, payment for operation of a service device 104 may be completed before the user 106 begins using the service device 104, such as if pre-payment is required. For example, said payment may be completed upon authentication of the payment token before the step 414.

In some embodiments, the user 106 selected an operation mode based on a predefined time period. The operation request includes the time period defined by the user 106 for operation of each service device 104. This time period defines the duration during which the user 106 is permitted access to operate the respective service device 104. The operation instructions for each service device 104 further includes the deactivation instruction for deactivating each service device 104 in response to lapsing of the respective time period, thereby denying the user 106 access to the respective service device 104. For example, the user 106 defines a time period of 1 hour for using the washing machine. The washing machine is activated to start the 1-hour period, and is deactivated upon lapsing of the 1-hour period. The payment amount is determined based on the selected operation mode and the time period. Specifically, there is a charge rate which may be predefined by the merchant aggregator 114 and/or the merchant 108. The payment amount would be $10 if the charge rate is $10 per hour.

In some embodiments, the user 106 selected an operation mode based on a predefined charge amount. The operation request includes the charge amount defined by the user 106 for operation of each service device 104. A time period for operation of each service device 104 is determined based on the respective charge amount. of the operation instructions for each service device 104 further includes the deactivation instruction for deactivating each service device 104 in response to lapsing of the respective time period, thereby denying the user 106 access to the respective service device 104. For example, the user 106 defines a charge amount of $10 for using the washing machine. The time period is determined based on a charge rate which may be predefined by the merchant aggregator 114 and/or the merchant 108. The time period would be 1 hour if the charge rate is $10 per hour. The washing machine is activated to start the 1-hour period, and is deactivated upon lapsing of the 1-hour period. The payment amount is determined based on the selected operation mode and the charge amount. The payment amount would be $10 if the charge amount for the washing machine is $10. It will be appreciated that the payment amount would be different if more service devices 106 are used, such as use of the washing machine in combination with a dryer.

In some embodiments, the user 106 selected an operation mode based on a specific operating cycle of the washing machine, such as delicate cycle. The operating cycle is associated with a predefined time period and a predefined charge amount. of the operation instructions for each service device 104 further includes the deactivation instruction for deactivating each service device 104 in response to lapsing of the predefined time period, thereby denying the user 106 access to the service device 104. The washing machine is activated to start the predefined time period, and is deactivated upon lapsing of the predefined time period. The payment amount is determined based on the selected operation mode and the charge amount.

In some embodiments, the user 106 selected an operation mode based on an ongoing basis of operating or using each service device 104. The operation instructions include the activation instruction and the service device 104 is activated in response to an activation command actuated by the user 106 at the service device 104, thereby permitting the user 106 to access the service device 104. The permitted access continues and the service device 104 remains operational until the user 106 stops it. The operation instructions further include the deactivation instruction and the service device 104 is deactivated in response to a deactivation command actuated by the user 106 at the service device 104, thereby terminating the permitted access and denying the user 106 access to the service device 104. Operation of the service device 104 is monitored and controlled by the respective device server 110, and the operation usage data is determined by the device server 110 based on operation of the service device 104 by the user 106 during the permitted access. The operation usage data is determined in response to deactivation of the service device 104. The payment network server 102 receives, from the device server 110, the operation usage data of the service device 104, and determines a time period for operation of the service device 104 based on the operation usage data. The payment amount is subsequently determined based on the selected operation usage mode and the time period, such as based on a predefined charge rate as described in some embodiments above.

The embodiments described above relate to operation or usage of a washing machine at a laundromat. It will be appreciated various aspects of these embodiments apply similarly or analogously to usage of a dryer or other related service devices 104 at the laundromat. It will also be appreciated that various aspects of these embodiments apply similarly or analogously to usage of various service devices 104, some of which are described in use cases below.

One example of a use case relates to usage of vending machines wherein the payment amount is determined based on the price of the products purchased from the vending machine. Another example is usage of gaming/recreational devices, or electronic devices like computers, television devices, and streaming devices. Hotels commonly provide computers in their business centres for use by guests, and provide television and streaming devices in the guest rooms. These service devices 104 are often used on an ongoing basis, i.e. the service devices 104 are voluntarily activated and deactivated on command by the user 106. As an example, the user 106 wants to use a streaming device to stream entertainment content on an ongoing basis. The time period of permitted access to the streaming device for operation of the streaming device begins after the user 106 is permitted access and starts using the streaming device, and the time period is determined after the user 106 stops using the streaming device and the permitted access is terminated. The payment amount for streaming the entertainment content is subsequently determined based on the time period and a predefined charge rate.

As mentioned in the background, many people in Africa have limited or no access to electricity and/or potable water. Service devices 104 such as solar energy service devices, water purifiers, or a combination of solar energy and water purifying service devices may be leased to merchant aggregators 114 in Africa to make solar energy and/or potable water more accessible and widely available across Africa. Usage of these service devices 104 may be charged based on a predefined time period, a predefined charge amount, or a predefined amount of solar energy and/or potable water extracted from the service devices 104.

In the embodiments described above, in the step 426, the payment network server 102 processes a payment transaction for paying the payment amount to the merchant aggregator using the payment token which is associated with the payment instrument of the user 106. The user 106 can thus pay for operation of the service devices 104 directly to the merchant aggregator 114, instead of separate payments to the respective merchants 108 of the service devices 104. In one embodiment, the payment transaction is processed before the user 106 finishes using the service device 104, such as if the user 106 has already predefined a time period or a charge amount in the operation request for using the service device 104. The time period would be allocated to the user 106 after the payment transaction is processed, permitting the user 106 to access and use the service device 104 during this time period. In another embodiment, the user 106 selects an operation mode for using the service device 104 on an ongoing basis, i.e. a pay-as-you-use or pay-as-you-go operation mode. The payment transaction is processed after the user 106 finishes using the service device 104 when the operation usage data of the service device 104 can be monitored and the payment amount determined therefrom.

The method 400 thus provides a convenient way for users 106 to request operation of the service devices 104 and to make payment for the operation. This advantageously allows the service devices 104 to be leased out to merchant aggregators 114 such as hotels, landlords, laundromats, and the like as described in various embodiments above. The merchant aggregators 114 would also be able to lease various service devices 104 from various merchants 108, providing an aggregator platform that integrates the various IoT platforms of the merchants 108. The users 106 would benefit by having a wider variety of service devices 104 to select. The merchants 108 would also benefit by collaborating or partnering with merchant aggregators 114 to distribute their service devices 104 to more users 106, particularly with hotel/apartment aggregators. The merchants 108 would be able to receive consolidated or batched payments from the merchant aggregators 114, instead of separate payments from the users 106 each and every time a service device 104 is operated. This obviates the need for merchants 108 to implement complex payment systems which would otherwise result in increased implementation and maintenance costs. With reduced costs, the merchants 108 would be able to make their service devices 104 more affordable to users 106, and potentially scaling up their business and outreach to a wider global audience.

Through their device servers 110 and IoT platforms, the merchants 108 would be able to monitor operation of their service devices 104 and generate the operation usage data accordingly. Furthermore, by analyzing the operation usage data, the merchants 108 may be able to gain insights from operation of their service devices 104, such as for improved allocation of their service devices 104 to the merchant aggregators 114. For example, if a merchant 108 is leasing washing machines and dryers to a few laundromats, the operation usage data may allow the merchant 108 to know which laundromats have more users 106, i.e. greater demand. The merchant 108 would then have the option of reallocating their washing machines and dryers to the laundromats with greater demands. Merchants 108 can also make appropriate maintenance plans depending on the overall operation usage of their service devices 104. While various types of service devices 104 and their associated industries are described herein, it will be appreciated that the system 100 and methods 200/400 can be similarly or analogously applied to other industries, such as but not limited to, liquid petroleum gas (LPG), sanitation, agriculture, and irrigation.

Technical Architecture

As used herein, a server is a physical or cloud data processing system on which a server program runs. The server may be implemented in hardware or software, or a combination thereof. Some non-limiting examples of the payment network server 102, device server 110, and application server 112 include computers, laptops, mini-computers, mainframe computers, any non-transient and tangible machines that can execute a machine-readable code, cloud-based servers, distributed server networks, and a network of computer systems.

Figure 5:
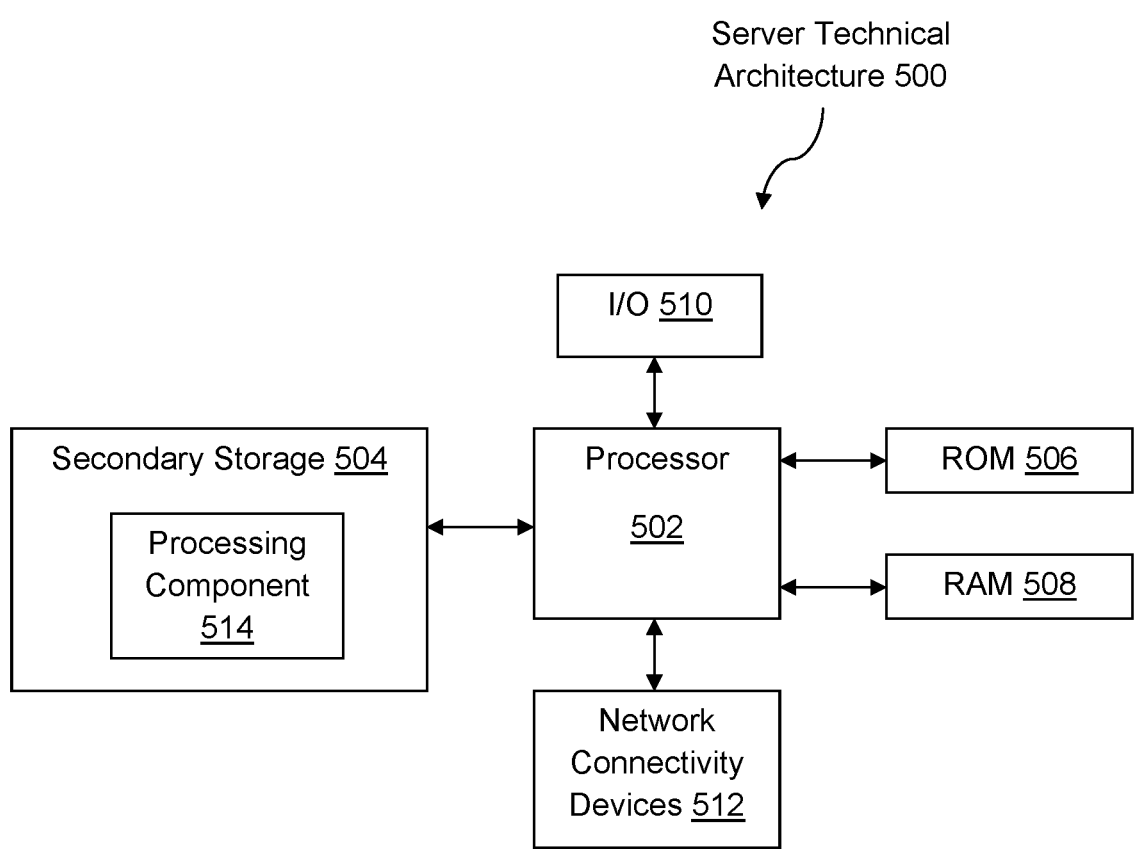
FIG. 5 is a block diagram illustration of the technical architecture of a server, in accordance with embodiments of the present disclosure.

FIG. 5 is a block diagram illustrating a technical architecture 500 of the payment network server 102. The device server 110 and application server 112 may share a similar technical architecture.

The technical architecture 500 includes a processor 502 (also referred to as a central processor unit or CPU) that is in communication with memory devices including secondary storage 504 (such as disk drives or memory cards), read-only memory (ROM) 506, and random-access memory (RAM) 508. The processor 502 may be implemented as one or more CPU chips. Various modules or components for performing various steps of the methods 200/300/400 are configured as part of the processor 502 and such steps are performed in response to non-transitory instructions operative or executed by the processor 502. The processor 502 includes suitable logic, circuitry, and/or interfaces to execute such steps. Some non-limiting examples of the processor 502 include an application-specific integrated circuit (ASIC) processor, a reduced instruction set computing (RISC) processor, a complex instruction set computing (CISC) processor, a field-programmable gate array (FPGA), and the like.

The technical architecture 500 further includes input/output (I/O) devices 510, and system connectivity/network devices 512. The secondary storage 504 typically includes one or more memory cards, disk drives, tape drives, or other storage devices and is used for non-volatile storage of data and as an over-flow data storage device if RAM 508 is not large enough to hold all working data. Secondary storage 504 may be used to store programs which are loaded into RAM 508 when such programs are selected for execution.

The secondary storage 504 has a processing component 514 including non-transitory instructions operative by the processor 502 to perform various steps of the methods 200/300/400 according to various embodiments of the present disclosure. The ROM 506 is used to store instructions and perhaps data which are read during program execution. The secondary storage 504, the ROM 506, and/or the RAM 508 may be referred to in some contexts as computer-readable storage media and/or non-transitory computer-readable media. Non-transitory computer-readable media include all computer-readable media, with the sole exception being a transitory propagating signal per se.

The I/O devices 510 may include printers, video monitors, liquid crystal displays (LCDs), plasma displays, touch screen displays, keyboards, keypads, switches, dials, mice, track balls, voice recognizers, card readers, paper tape readers, and/or other known input devices.

The system connectivity/network devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communication (NFC), radio frequency identity (RFID), and/or other air interface protocol radio transceiver cards, and other known system connectivity/network devices. These system connectivity/network devices 512 may enable the processor 502 to communicate with the Internet or one or more intranets. With such a system/network connection, it is contemplated that the processor 502 might receive information from the network, or might output information to the network in the course of performing the steps of the methods 200/300/400. Such information, which is often represented as a sequence of instructions to be executed using processor 502, may be received from and outputted to the network, for example, in the form of a computer data signal embodied in a carrier wave.

The processor 502 executes instructions, codes, computer programs, scripts which it accesses from hard disk, floppy disk, optical disk (these various disk-based systems may all be considered secondary storage 504), flash drive, ROM 506, RAM 508, or the system connectivity/network devices 512. While only one processor 502 is shown, multiple processors may be present. Thus, while instructions may be discussed as executed by a processor, the instructions may be executed simultaneously, serially, or otherwise executed by one or multiple processors.

The technical architecture 500 may be formed by one computer, or multiple computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the multiple computers. In an embodiment, virtualization software may be employed by the technical architecture 500 to provide the functionality of a number of servers that is not directly bound to the number of computers in the technical architecture 500. In an embodiment, the functionality disclosed above may be provided by executing the application and/or applications in a cloud computing environment. Cloud computing may include providing computing services via a system/network connection using dynamically scalable computing resources. A cloud computing environment may be established by an enterprise and/or may be hired on an as-needed basis from a third-party provider.

It is understood that by programming and/or loading executable instructions onto the technical architecture 500, at least one of the CPU 502, ROM 506, and RAM 508 are changed, transforming the technical architecture 500 in part into a specific purpose machine or apparatus having the functionality as taught by various embodiments of the present disclosure. It is fundamental to the electrical engineering and software engineering arts that functionality that can be implemented by loading executable software into a computer can be converted to a hardware implementation by known design rules.

Furthermore, various embodiments of the present disclosure may be implemented as a method, apparatus, or article of manufacture using standard programming and/or engineering techniques to produce software, firmware, hardware, or any combination thereof to control a computer to implement the disclosed embodiments. For instance, various embodiments may be implemented as a computer-readable medium embedded with a computer-executable program, which encompasses a computer program accessible from any computer-readable storage device or storage media. For example, computer-readable media can include but are not limited to magnetic storage devices (e.g. hard disk, floppy disk, or magnetic strips), optical discs (e.g. compact disc (CD), digital versatile disc (DVD), or Blu-ray disc), smart cards, flash memory devices (e.g. card, stick, or key drive), and solid state drives/memory devices.

In the foregoing detailed description, embodiments of the present disclosure in relation to an electronic system and computerized method for controlling operation of service devices are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A computerized method for controlling operation of service devices, the method performed by a payment network server and comprising:
   receiving, via an aggregator platform of a merchant aggregator operated on an application server, an operation request from a user device for operation of one or more of the service devices associated with the merchant aggregator, the operation request comprising identification data of each service device, an operation mode selected by the user for each service device, and a payment token associated with a payment instrument of the user, wherein the operation mode comprises one or more operation modes and the one or more operation modes include an operating cycle of the service device;
   identifying, based on the identification data of each service device, a device server communicatively connected with the respective service device;
   communicating, to the respective device server, operation instructions for controlling access to each service device for operation thereof by the user,
   wherein the operation instructions are based on the user's spending history, the operation instructions comprising an activation instruction for activating the respective service device, thereby permitting the user to access the respective service device;
   determining a payment amount for operation of the service devices requested in the operation request based at least on the selected operation modes; and
   processing a payment transaction for paying the payment amount to the merchant aggregator using the payment token.

2. The method according to claim 1, further comprising authenticating the payment token for said payment to the merchant aggregator, wherein the operation instructions are communicated to the device servers in response to authentication of the payment token.

3. The method according to claim 1, wherein the operation request further comprises a time period defined by the user for operation of each service device, and wherein the payment amount is determined based additionally on the time periods.

4. The method according to claim 3, wherein the operation instructions further comprise a deactivation instruction for deactivating each service device in response to lapsing of the respective time period, thereby denying the user access to the respective service device.

5. The method according to claim 1, wherein the operation request further comprises a charge amount defined by the user for operation of each service device, and wherein the payment amount is determined based additionally on the charge amounts.

6. The method according to claim 5, further comprising determining a time period for permitting access to each service device based on the respective charge amount.

7. The method according to claim 1, further comprising:
receiving, from the device server, operation usage data of each service device determined based on operation thereof by the user during the permitted access; and
determining a time period for the operation of each service device based on the respective operation usage data,
wherein the payment amount is determined based additionally on the time periods.

8. The method according to claim 7, wherein the operation instructions further comprise a deactivation instruction for deactivating each service device in response to a deactivation command actuated by the user at the respective service device, thereby denying the user access to the respective service device, and wherein the respective operation usage data is determined in response to deactivation of the respective service device.

9. The method according to claim 1, further comprising performing a registration process for each service device, the registration process comprising:
receiving, from the application server, a registration request for registration of the respective service device, the registration request comprising details of the respective service device;
generating the identification data of the respective service device;
communicating the identification data to the application server; and
communicating said registration to the respective device server for the respective service device,
wherein the respective service device is associated with the merchant aggregator upon said registration of the respective service device.

10. The method according to claim 9, wherein the service device details of each service device comprise cloud adaptor data for facilitating communication between the payment network server and the device server for the respective service device, and wherein the operation instructions include instructions to prevent user access in response to a determination that the user's spending history shows a high level of debt.

11. The method according to claim 9, wherein the service device details of each service device comprise the one or more operation modes and the one or more operation modes comprises a set of operation modes selectable by the user.

12. A payment network server communicatively connected to an application server of a merchant aggregator and a number of device servers, each device server communicatively connected with a number of service devices associated with the merchant aggregator, the payment network server configured for controlling operation of the service devices and comprising:
an operation request module configured for:
receiving, via an aggregator platform of the merchant aggregator operated on the application server, an operation request from a user device for operation of one or more of the service devices, the operation request comprising identification data of each service device, an operation mode selected by the user device for each service device, and a payment token associated with a payment instrument of the user, wherein the operation mode comprises one or more operation modes and the one or more operation modes include an operating cycle of the service device;
identifying, based on the identification data of each service device, the device server communicatively connected with the respective service device;
an operation instruction module configured for:
communicating, to the respective device server, a set of operation instructions for controlling access to each service device for operation thereof by the user, wherein the operation instructions are based on the user's spending history, the operation instructions comprising an activation instruction for activating the respective service device, thereby permitting the user to access the respective service device; and
a payment module configured for:
determining a payment amount for operation of the service devices requested in the operation request based at least on the selected operation modes; and
processing a payment transaction for paying the payment amount to the merchant aggregator using the payment token.

13. The payment network server according to claim 12, wherein the operation instruction module is further configured for authenticating the payment token for said payment to the merchant aggregator, wherein the operation instructions are communicated to the device servers in response to authentication of the payment token.

14. The payment network server according to claim 12, wherein the operation request further comprises a time period defined by the user for operation of each service device, and wherein the payment amount is determined based additionally on the time periods.

15. The payment network server according to claim 14, wherein the operation instructions further comprise a deactivation instruction for deactivating each service device in response to lapsing of the respective time period, thereby denying the user access to the respective service device.

16. The payment network server according to claim 12, wherein the operation request further comprises a charge amount defined by the user for operation of each service device, and wherein the payment amount is determined based additionally on the charge amounts.

17. The payment network server according to claim 16, further comprising determining a time period for operation of each service device based on the respective charge amount.

18. The payment network server according to claim 12, wherein the operation instruction module is further configured for receiving, from the device server, operation usage data of each service device determined based on operation thereof by the user during the permitted access;
wherein the payment module is further configured for determining a time period for operation of each service device based on the respective operation usage data; and
wherein the payment amount is determined based additionally on the time periods.

19. The payment network server according to claim 18, wherein the operation instructions further comprise a deactivation instruction for deactivating each service device in response to a deactivation command actuated by the user at the respective service device, thereby denying the user access to the respective service device, and wherein the respective operation usage data is determined in response to deactivation of the respective service device.

20. The payment network server according to claim 12, further comprising a registration module configured for performing a registration process for each service device, the registration process comprising:
  receiving, from the application server, a registration request for registration of the respective service device, the registration request comprising details of the respective service device;
  generating the identification data of the respective service device;
  communicating the identification data to the application server; and
  communicating said registration to the respective device server for the respective service device,
  wherein the respective service device is associated with the merchant aggregator upon said registration of the respective service device.

* * * * *